Aug. 14, 1951 C. F. WOLTERS 2,564,589
ACCOUNTANT'S APPARATUS
Filed Aug. 31, 1945 8 Sheets-Sheet 3

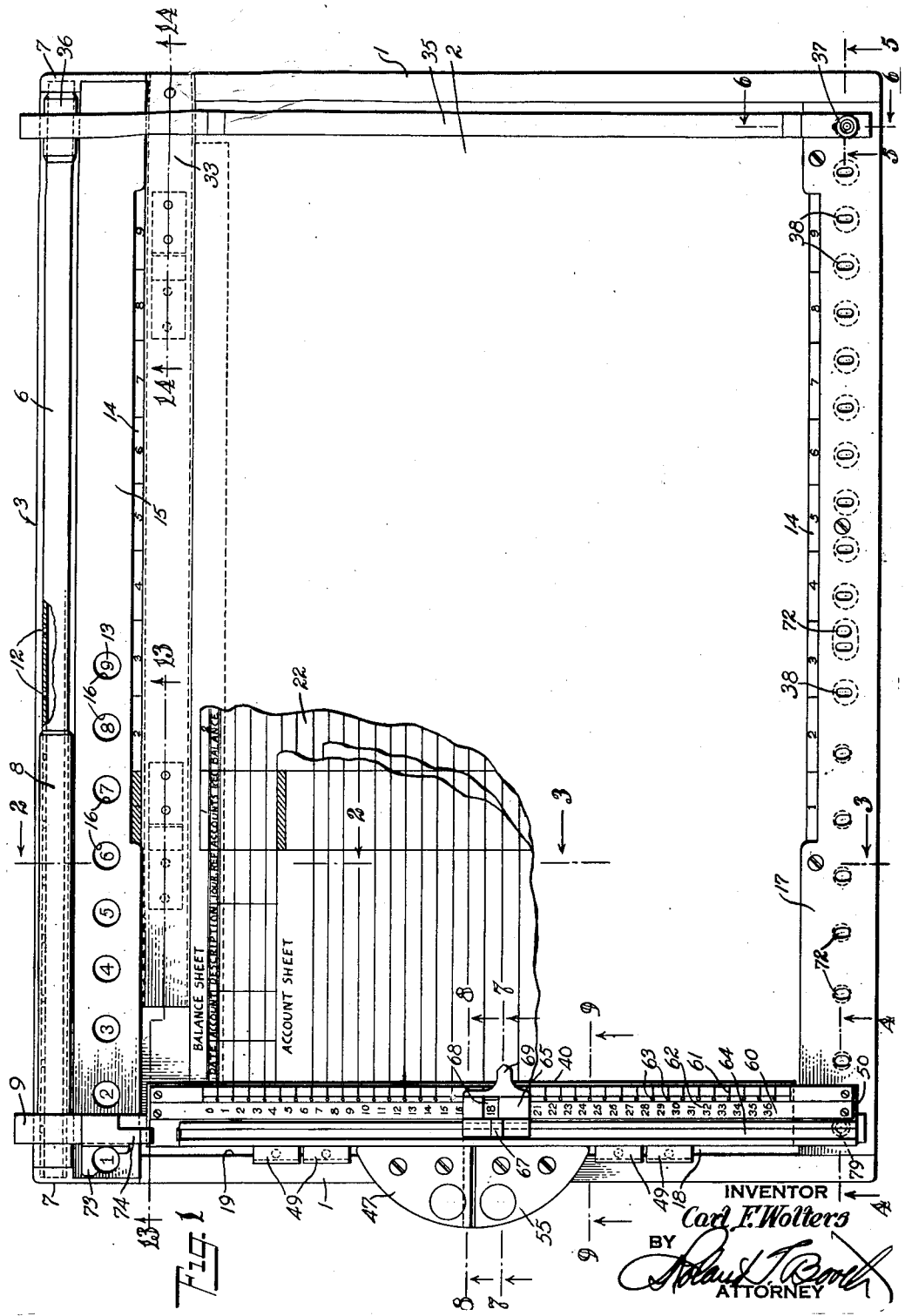

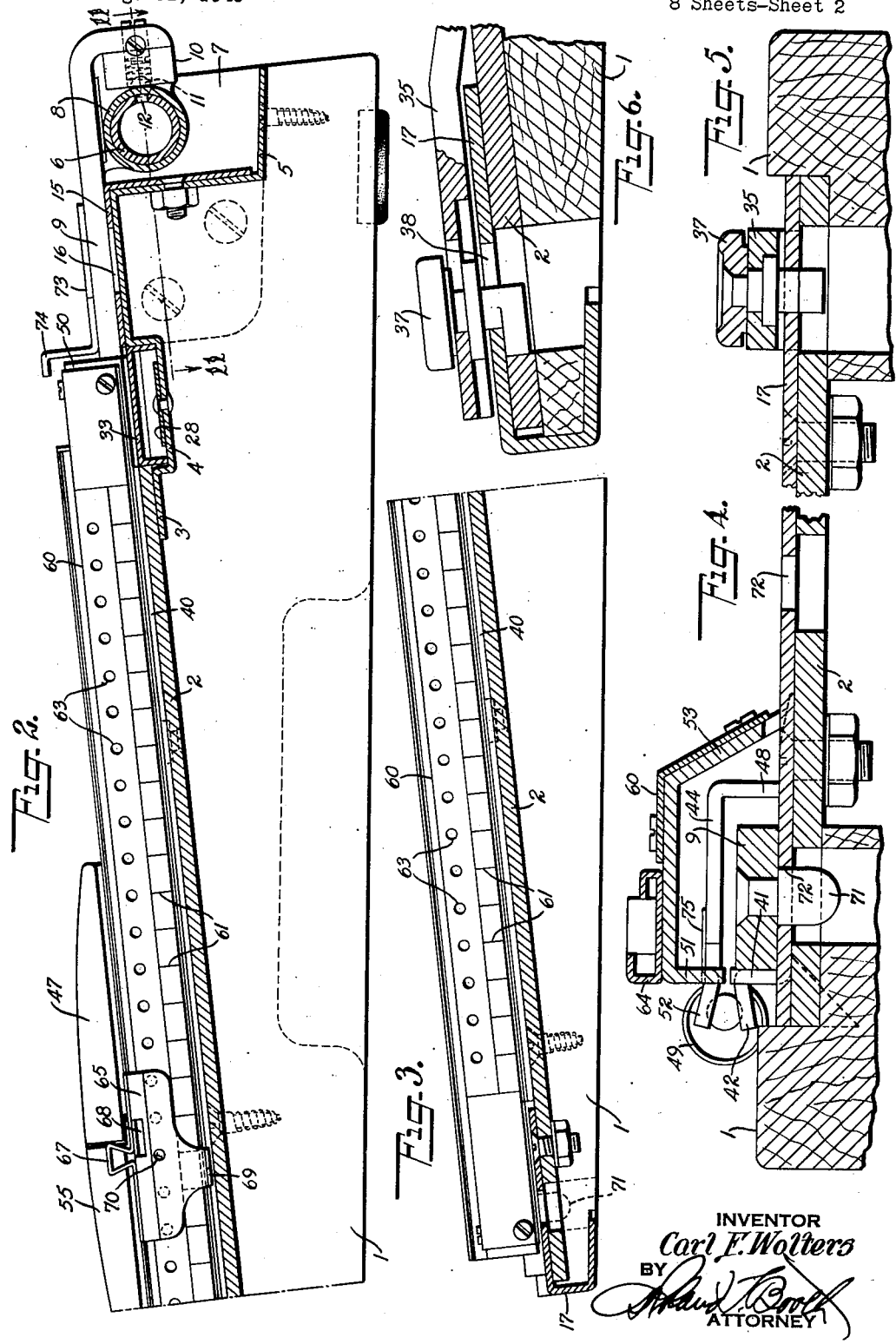

INVENTOR
Carl F. Wolters
BY
ATTORNEY

Aug. 14, 1951 — C. F. WOLTERS — 2,564,589
ACCOUNTANT'S APPARATUS
Filed Aug. 31, 1945 — 8 Sheets-Sheet 4
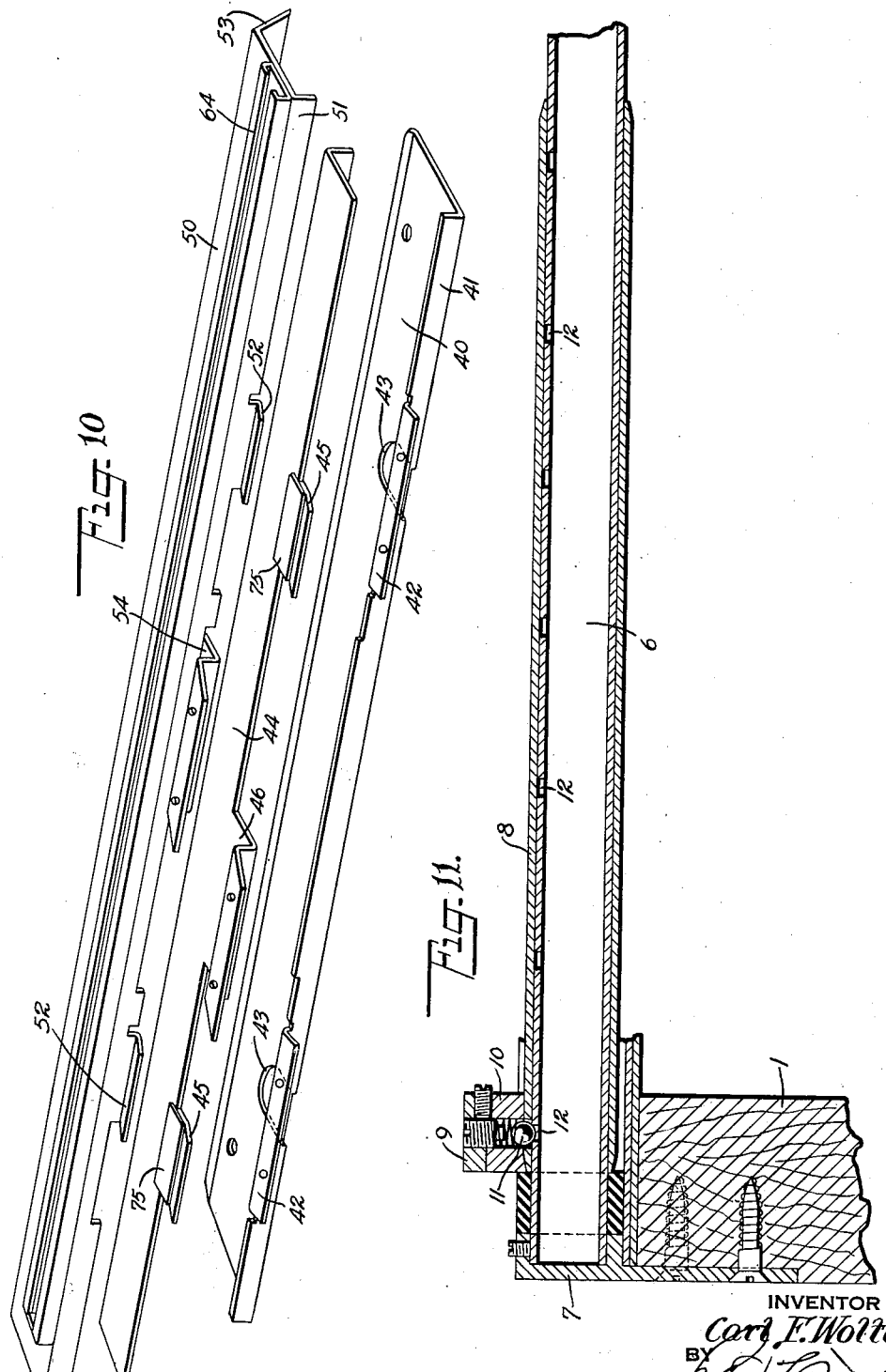
INVENTOR
Carl F. Wolters
BY
ATTORNEY

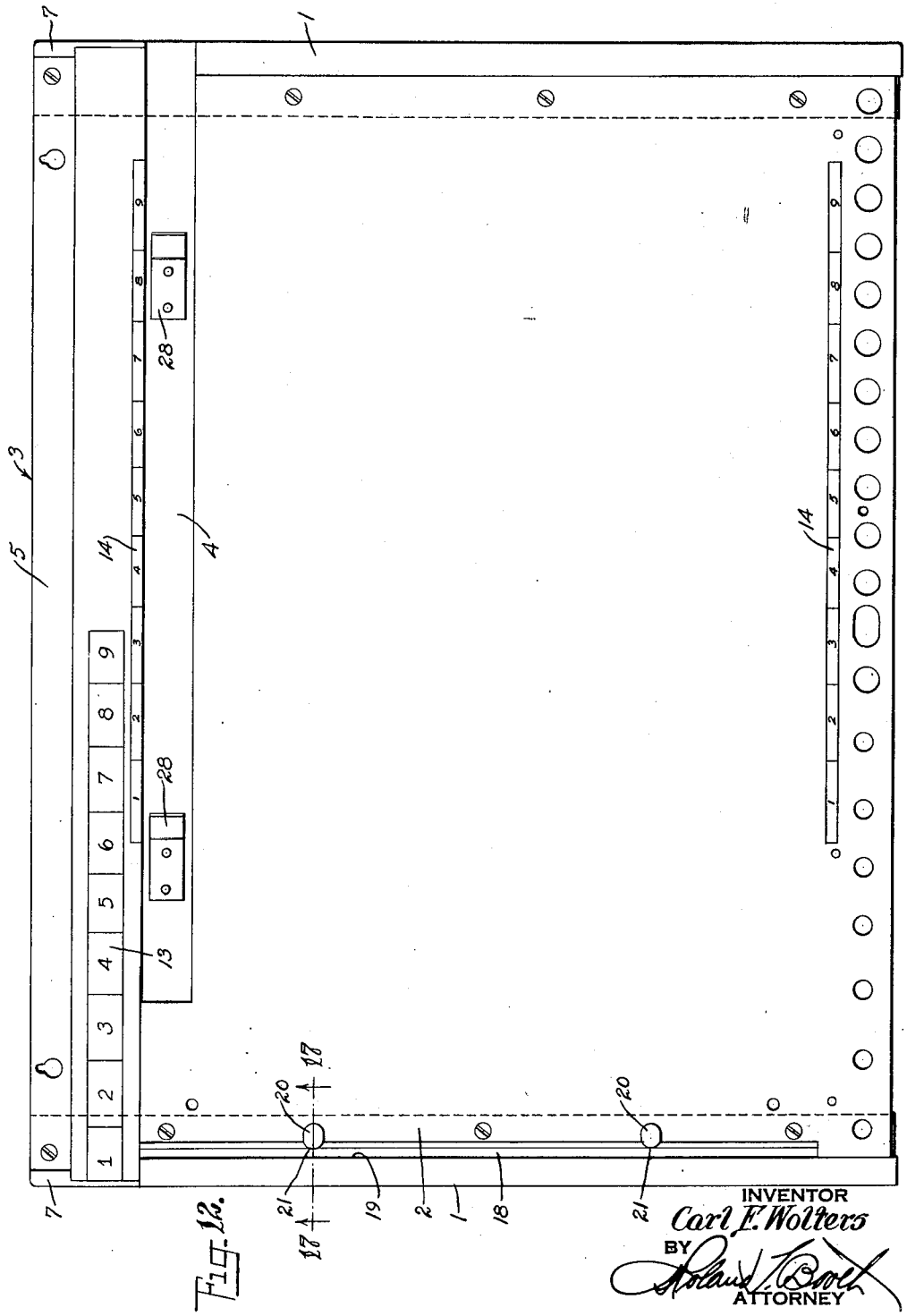

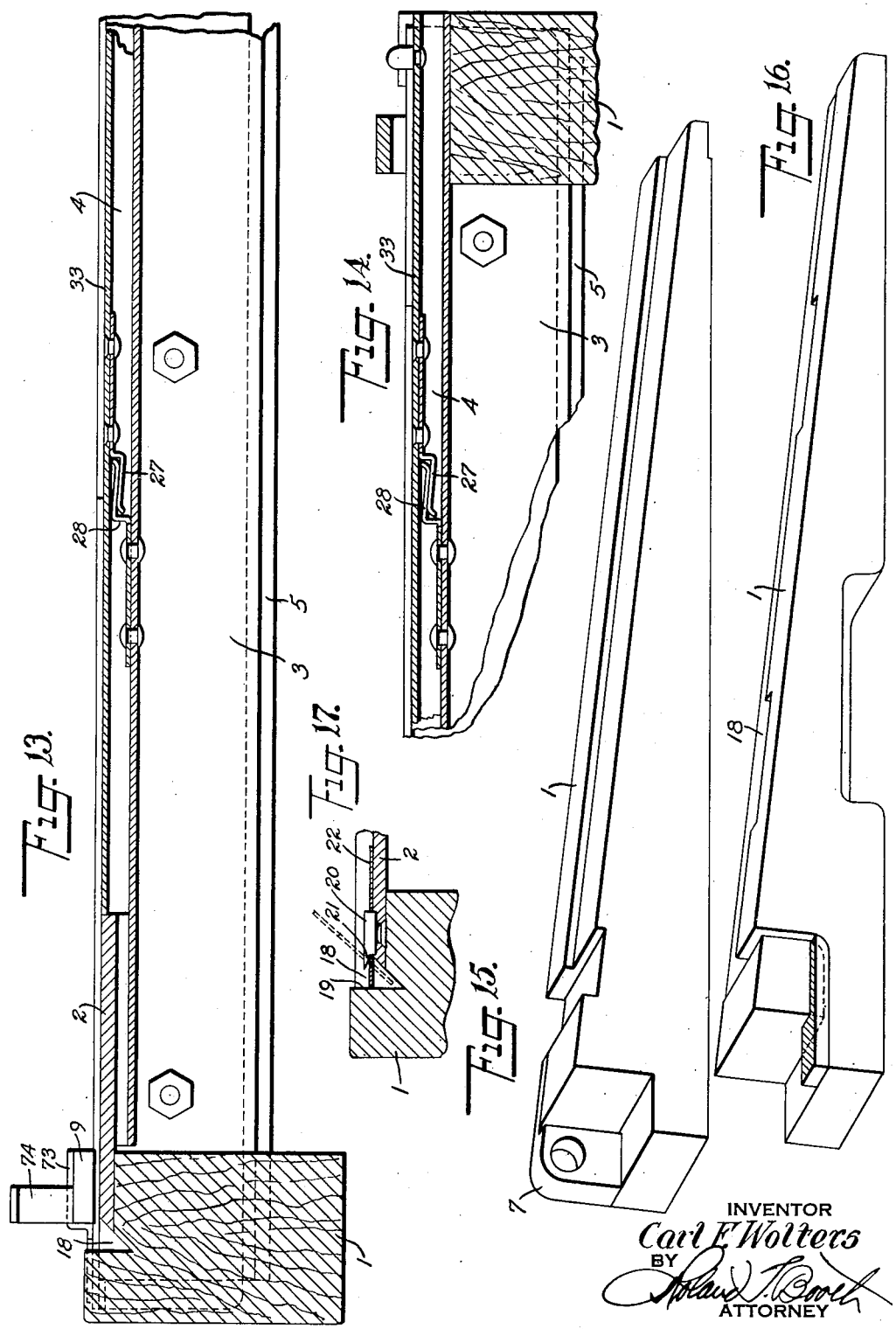

Aug. 14, 1951
C. F. WOLTERS
2,564,589
ACCOUNTANT'S APPARATUS
Filed Aug. 31, 1945
8 Sheets-Sheet 7
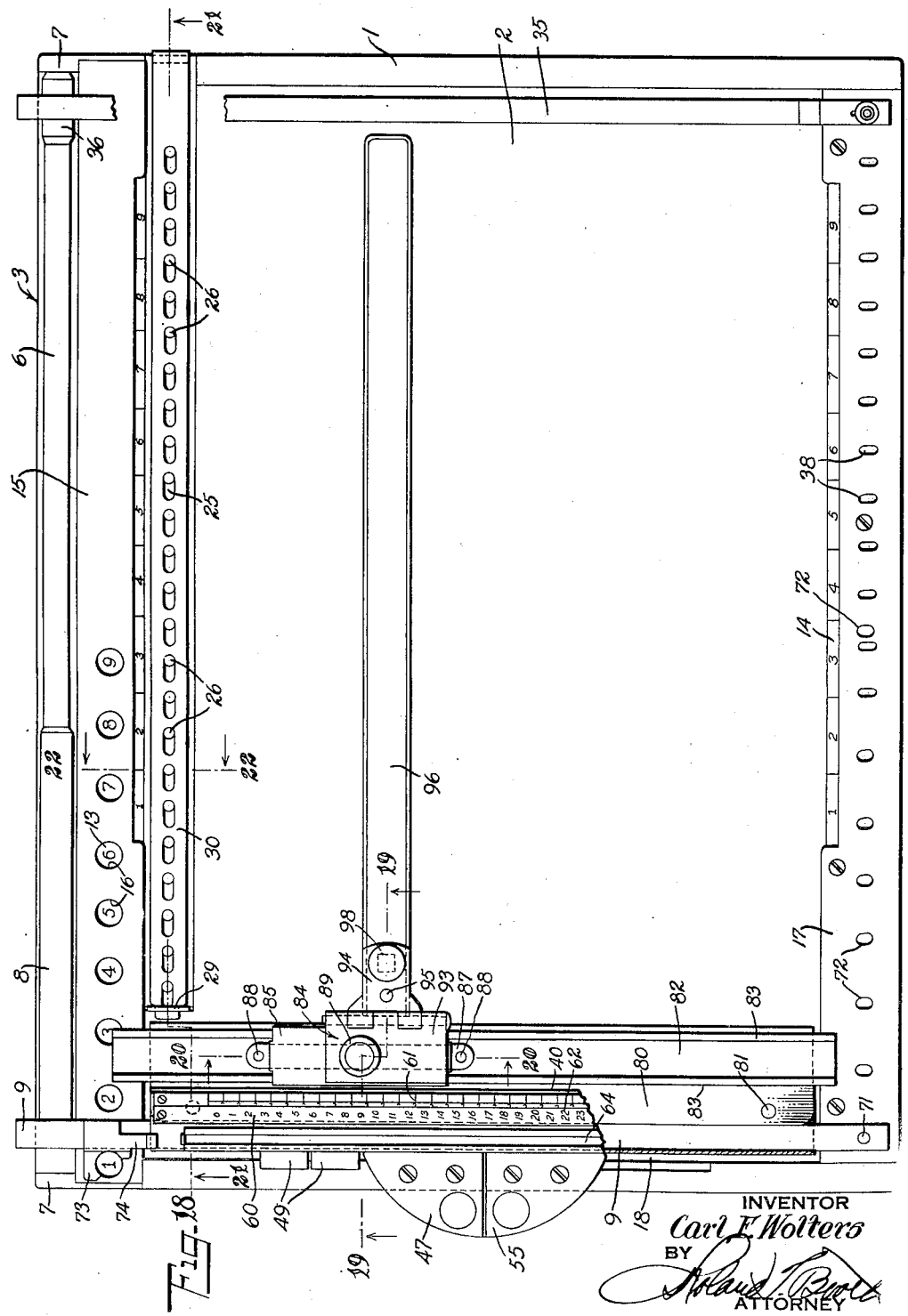
INVENTOR
Carl F. Wolters
BY
ATTORNEY

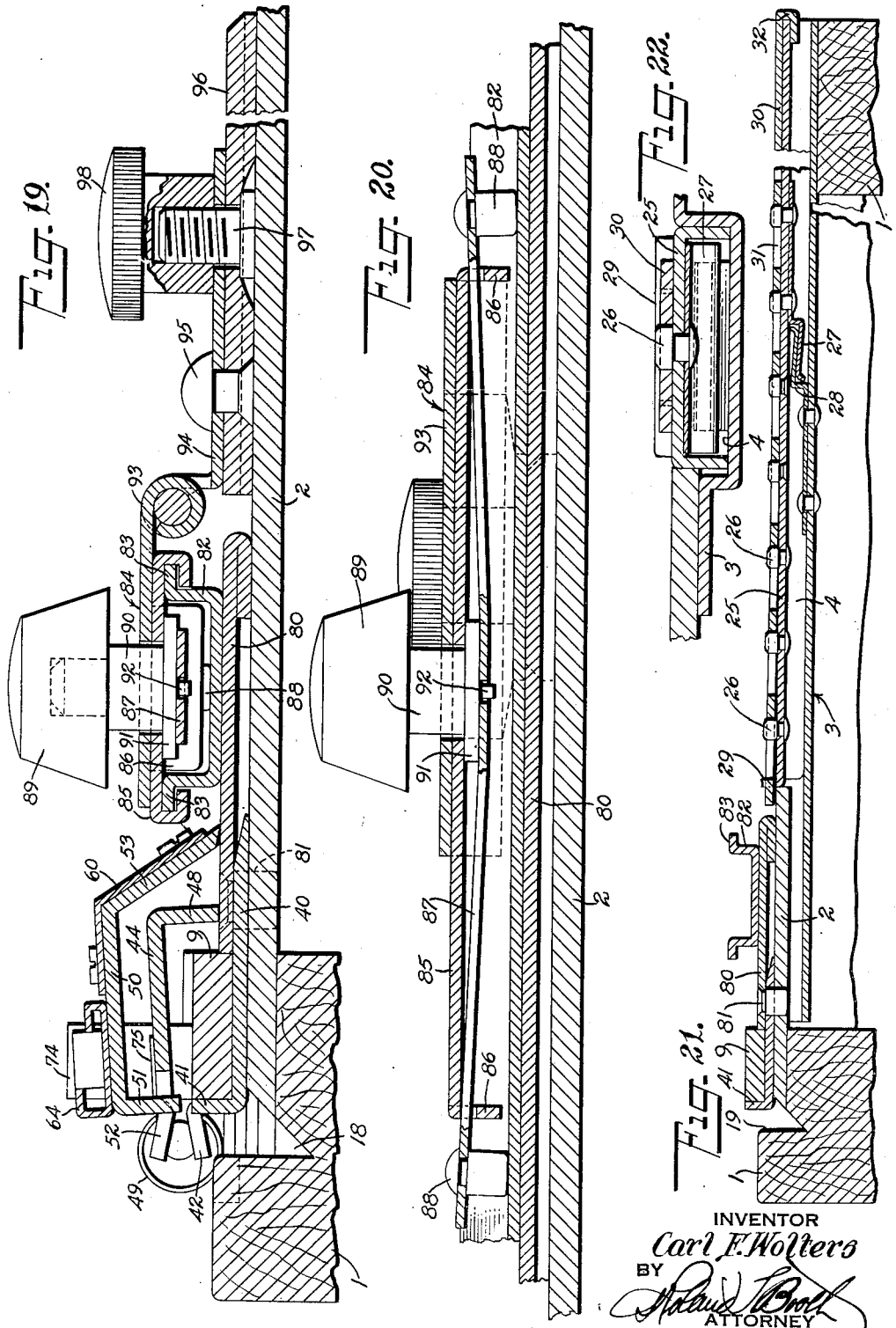

Patented Aug. 14, 1951

2,564,589

UNITED STATES PATENT OFFICE 2,564,589

ACCOUNTANT'S APPARATUS

Carl F. Wolters, Kenmore, N. Y., assignor to Remington Rand Inc., Buffalo, N. Y., a corporation of Delaware Application August 31, 1945, Serial No. 613,815

12 Claims. (Cl. 282—29)

This invention relates to an apparatus for use in the posting of accounts and is more particularly directed to improvements in the apparatus shown in Patent No. 2,311,052 of February 16, 1943.

The invention provides improvements over previous apparatus of this type wherein a much greater variety of accounting operations are facilitated through the construction of the apparatus to support two or more accounting sheets in selective relation to each other and a balance sheet independently supported on a platen and arranged so that the apparatus will move the accounting sheets over the balance sheet into a series of selective positions for duplicating entries on all of the sheets in selective positions during the making of an original entry on the top sheet of a series.

The invention provides for combining peg board accounting operations in the use of the usual peg board accounting sheets with accounting operations on the usual ledger or journal sheets with accounting sheets associated therewith in order to duplicate entries in selective positions of adjustment of the accounting sheets and peg board sheets relative to the balance sheet in facilitating combined accounting operations with simplification in work and accounting procedure. This improved accounting apparatus is adapted for simplifying the work in accounting procedure in many different types of accounting systems now in use with but slight modification of sheet ruling and with the securing of registration between many different types of accounting forms that may receive duplicate entries so that all of the duplicate entries may be simultaneously made on this apparatus instead of requiring a series of independent duplicate entries on the separate sheets, as heretofore required.

The invention comprehends the provision of an accountant's apparatus wherein the platen for receiving the balance sheet is provided with an account sheet carriage and clamping mechanism so one of more sheets can be individually secured in clamped position in the clamping mechanism in selective positions relative to each other for movement into selective positions of adjustment over the balance sheet in securing duplicate entries of information simultaneously on all of the sheets in desired position; a sheet clamping means having a pair of clamping strips movably mounted for independent cooperation with a sheet supporting member and arranged with independent handles on the clamping strips providing for individual or joint operation of the clamping strips relative to the sheet supporting member in clamping one or two or more sheets in position therein; a sheet clamping means having a plurality of sheet clamping strips individually cooperative with a sheet supporting member in which sheet abutments are provided on some of the sheet clamping strips and in conjunction with the sheet supporting member to individually position account sheets in different supported positions in the clamping mechanism against different sheet aligning abutments; a line indicating means having a scale strip and a guide member carrying a slidable line pointer on said sheet clamping means for cooperation therewith in indicating the line position on the account sheets and balance sheets carried by the apparatus together with a line indication on said sheets by the pointer in cooperation with the scale strip; and a line finder cooperating with the apparatus and having an attaching member formed for detachable engagement with the sheet clamping means and provided with a guideway for slidably receiving one end of a straight edge extending over the sheets on the platen for indicating the alignment of all of the lines on all of the sheets on the platen for aiding in the making of accounting entries on a series of sheets carried by the platen and on the same aligned portions on all of said sheets.

The invention provides an accountant's apparatus wherein the platen has a sheet clamping means for supporting account sheets over a balance sheet carried by the platen so that the account sheets can be moved over the balance sheet to a selected position together with a peg strip carried by the platen for supporting peg board accounting sheets in overlapping offset relation for both peg board accounting purposes in the usual manner and also for combined accounting in cooperation with the account sheets carried by the sheet clamping means and the balance sheet carried by the platen in which all of the sheets are supported so that the vertical columns and horizontal lines on the peg board sheets, the account sheets and the balance sheets will be brought into registry in a desired manner to facilitate simplification of work and accounting procedure.

The present invention includes many improvements in the structural features of the apparatus which will be more fully pointed out in the following description and claims.

In the drawings:

Fig. 1 is a plan view of the improved accountant's apparatus showing fragmentary portions of an account and balance sheet thereon.

Fig. 2 is an enlarged cross-section taken on line 2—2 of Fig. 1.

Fig. 3 is an enlarged cross-section taken on line 3—3 of Fig. 1.

Fig. 4 is an enlarged cross-section taken on line 4—4 of Fig. 1.

Fig. 5 is an enlarged cross-section taken on line 5—5 of Fig. 1.

Fig. 6 is an enlarged cross-section taken on line 6—6 of Fig. 1.

Figure 7:
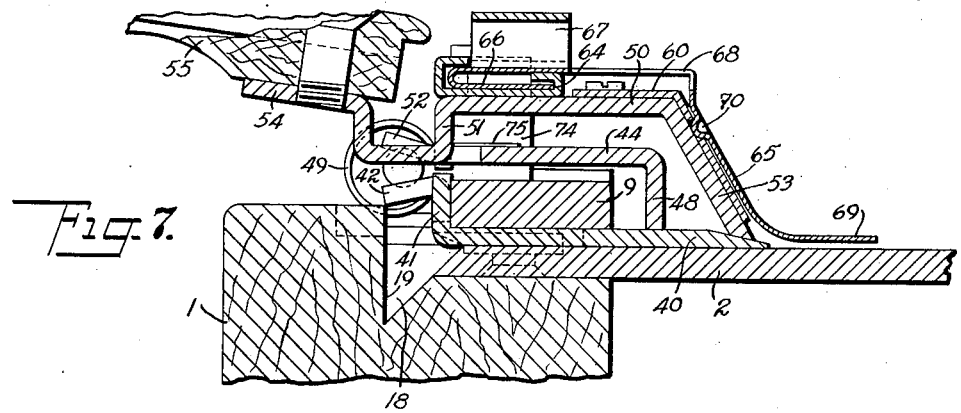
Figure 8:
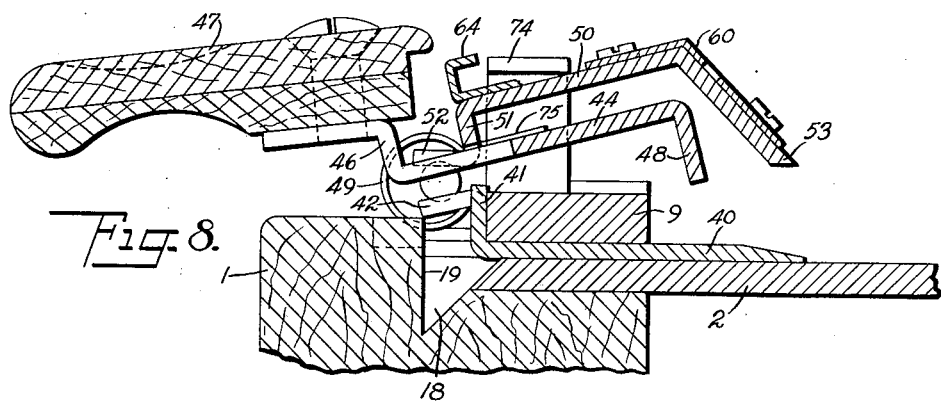
Figure 9:
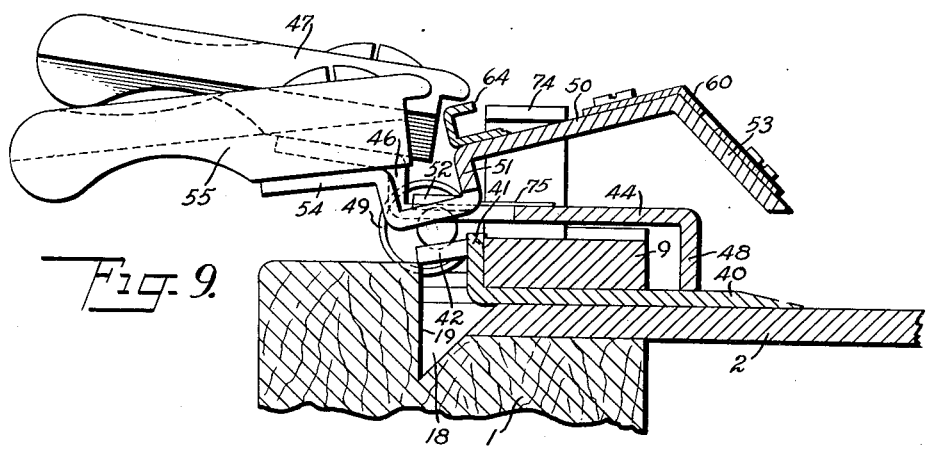

Figs. 7, 8 and 9 are enlarged cross-sections taken respectively on lines 7—7, 8—8 and 9—9 of Fig. 1 showing details of the sheet clamping means in the sheet clamping position of both clamping strips, the sheet releasing position of both clamping strips and the sheet releasing position of one clamping strip and sheet holding position of the other clamping strip, respectively, in the several views.

Fig. 10 illustrates the details of construction of the sheet clamping strips and sheet supporting member on an enlarged scale in disassembled perspective relation.

Fig. 11 is an enlarged horizontal cross-section taken on line 11—11 of Fig. 2.

Fig. 12 is a plan view of the platen from which the sheet clamping means, framing strips and other parts have been removed with portions broken away and shown in cross-section for illustrating details of construction of the platen.

Fig. 13 is an enlarged cross-section taken substantially on line 13—13 of Fig. 1.

Fig. 14 is an enlarged detail cross-section taken substantially on line 14—14 of Fig. 1.

Figs. 15 and 16 are perspectives showing the side rails forming the main support for the apparatus, portions of the side rail shown in Fig. 16 being broken away and shown in cross-section to illustrate some of the details of construction.

Fig. 17 is an enlarged fragmentary detail cross-section taken on line 17—17 of Fig. 12.

Fig. 18 is a plan view of the accounting apparatus showing the line finder applied in operative position in the sheet clamping structure, portions being broken away and shown in cross-section for convenience in illustration.

Fig. 19 is an enlarged cross-section with portions broken away, taken on line 19—19 of Fig. 18.

Fig. 20 is an enlarged detail cross-section taken on line 20—20 of Fig. 18.

Fig. 21 is an enlarged fragmentray cross-section taken on line 21—21 of Fig. 18.

Fig. 22 is an enlarged detail cross-section taken on line 22—22 of Fig. 18.

The improved accounting apparatus has a pair of side rails 1 forming the main support for the apparatus to which opposite sides of the platen 2 are rigidly secured in rabbets provided along the inner upper edges of the side rails, as illustrated in Figs. 1 and 13 to 16 inclusive. The platen is of rectangular shape and is in the form of a flat plate member having a size and configuration as will be clearly understood from the illustration in Figs. 1 and 12. The front edge of platen 2 terminates in substantially coincident relation with the front end of side rails 1 while the rear edge of platen 2 terminates in spaced relation inwardly from the rear ends of side rails 1, as shown in Fig. 2. A rear frame 3 has the front edge offset and secured to the rear under surface of platen 2 along the rear margin of the platen. Frame 3 is formed with a channel 4 for receiving a peg strip assembly hereinafter described. Frame 3 extends between and is secured to the rear ends of side rails 1 and is formed with a downwardly offset rear marginal portion 5 to provide a recess below the plane of platen 2, as shown in Fig. 2, for receiving tubular shaft 6 mounted at opposite ends in shaft supporting brackets 7, see Figs. 1, 2, 11 and 12, mounted on the rear outer corner of side rails 1.

Tubular shaft 6 slidably supports a carriage assembly having a sleeve 8 slidable on said shaft and carrying a laterally extending carriage bar 9 extending to the front of platen 1 over the upper face thereof, as clearly shown in Fig. 1. The carriage assembly with carriage bar 9 is adapted for swinging movement about shaft 6 into a substantially vertical extending position slightly past dead center so that the carriage assembly will retain a substantially vertical extending position with the rear portion of the carriage bar structure, indicated at 10 in Fig. 2, engaged against the connecting portion of rear frame 3 adjacent offset margin 5. The rear portion 10 of the carriage assembly provides for the mounting of carriage bar 9 on sleeve 8 and houses a spring pressed ball 11 for selective engagement in any one of a plurality of apertures 12 formed in tubular shaft 6. Apertures 12 are placed at predetermined differently spaced distances along shaft 6 for positioning the carriage assembly in any one of a number of selective positions wherein the carriage assembly will support an account sheet so that selected columns and lines thereon may be registered with corresponding columns and lines on a balance sheet mounted on platen 2.

A decalcomania 13, see Figs. 1 and 12 is applied to the upper face of rear frame 3 along the rear marginal portion thereof between channel 4 and the portion connecting with offset margin 5. This decalcomania is applied to the left-hand end of rear frame 3, as illustrated in Fig. 12 and is divided into a plurality of differently colored sections each containing in serial order, one of the digits 1 to 9, inclusive, as illustrated. In advance of decal 13, rear frame 3 carries a decal 14 in the form of an elongated strip applied to the upper face of rear frame 3 along the portion immediately to the rear of channel 4. Decalcomania 14 is arranged in a position spaced to the right of decal 13, as shown in Fig. 12 and has a plurality of rectangular sections each appropriately colored and designated by one of the numerals 1 to 9 inclusive. The spacing arrangement between colored areas and digits on decal 14 is specifically different and also has different dimensions from each of the corresponding dimensions of the colored areas and digits on decal 13. The dimensions of the decal 13 however, correspond with the dimensions between apertures 12 and while the dimensions between each digit of decal 13 is different from the adjacent digit thereon, the dimension between adjacent apertures 12 is varied in a corresponding manner. A second decal 14 is positioned along the front marginal portion of platen 2 in aligned relation with decal 14 at the rear portion.

A framing strip 15 of angular form is secured over the rear portion of rear frame 3, as shown in Fig. 2 above offset flange 5 to provide a cover and protection for decals 13 and 14 carried by rear frame 3. Framing strip 15 is formed with a plurality of apertures 16 in registry with the digits of decal 13 so that the digits and the colored background about each digit is plainly visible through apertures 16. The forward edge of framing strip 15 is recessed throughout the length of decal 14, as shown in Fig. 1, in order to display the full length of the decalcomania in the recessed portion thereof. The front edge of rear framing strip 15 terminates adjacent the rear edge of channel 4. A front framing strip 17 is mounted on the front margin of platen 2 and is recessed to expose front decal strip 14 in the manner shown in Fig. 1. Front framing strip 17 extends entirely across the front of platen 2 between side rails 1, as clearly shown in Fig. 1 and embraces the front edge of platen 2, as shown in Fig. 3.

Side rail 1, at the left-hand side of platen 2, as shown in Figs. 1, 7, 12 and 17 is formed with the side edge of the platen to provide a groove 18 having a vertical sheet positioning abutment 19 formed on side rail 1 at the outer portion of groove 18, while the side rail and the side edge of platen 2 defining the inner face of groove 18 is formed in inclined relation. A pair of sheet supporting posts 20, Figs. 12 and 17 are mounted on the platen at the edge adjacent groove 18 and have flanges 21 extending laterally therefrom partially over groove 18. These posts are adapted to receive and hold an accounting sheet or sheets on platen 2. These sheets are referred to as balance sheets and may comprise any kind of accounting forms used for any accounting or bookkeeping system, the term "balance sheet" being used for identification purposes only.

The balance sheet indicated at 22 in Figs. 1 and 17 in fragmentary form, is provided with a pair of apertures in the left-hand margin of the sheets spaced inwardly from the edge a sufficient distance so that these apertures may be engaged over posts 20 under flanges 21 by first placing the left-hand edge of the sheet in an inclined position, as indicated in dotted lines in Fig. 17 to engage the portion of the sheet adjacent the aperture under flange 21. Then, sheet 22 is rotated from the upwardly inclined dotted line position as indicated in Fig. 17 toward platen 2 until it lies flat on the platen, as shown in full lines in Fig. 17. In this operation, the left-hand edge of the sheet will engage sheet positioning abutment 19 so that the margin of the sheet adjacent the post receiving apertures therein will lie under flanges 21 with the edge of the sheet against abutment 19 for positioning and holding the sheet in a substantially squared position on platen 2. Flanges 21 will project over the margin of sheet 22 adjacent the post receiving apertures therein when the sheet is in the full line position, as shown in Fig. 17, and prevent accidental detachment of the sheet from the post through the cooperation of abutment 19 therewith. The sheet margin at the apertures has a dimension equal approximately to the distance between the periphery of posts 20 and abutment 18. Therefore, in order to remove the sheet from the platen, it is necessary to raise it up into the position shown in dotted lines in Fig. 17.

The dimensions of groove 18 are such that when the margin of the sheet is moved so that the edge of the sheet is in the bottom of groove 18, as shown in Fig. 17, the post receiving apertures formed in the sheet can be disengaged from post 20 and from under flanges 21 without injury to the sheet. This structure has been shown to be very efficient in holding balance sheet 22 so that the right-hand end will be held against movement toward the front or back portions of platen 2 to an extent that would interfere with posting operations thereon. Balance sheet 22 may be of any width that is to be found desirable for use in an accounting system employing the present apparatus. The printed form on the balance sheet will be in accordance with any desired character of accounting system and will have the vertical columns printed thereon with a variable spacing to correspond with the spacing arrangement of decals 14 and a horizontal line spacing to correspond with a line indicating scale to be hereinafter described.

Channel 4 in rear frame 3 is provided for detachably receiving a peg strip assembly. A peg strip 25 carries a plurality of equally spaced sheet receiving pegs 26, as shown in Figs. 21 and 22. A pair of spring fingers 27 are mounted on the bottom of peg strip 25 at spaced intervals near opposite ends and project toward the left-hand side of the apparatus, as shown in Fig. 21 for detachable engagement with spring fingers 28 mounted on rear frame 3 in the bottom of channel 4. The left-hand end of peg strip 25 has an apertured projection 29 extending upwardly therefrom to slidably receive and retain one end of a sheet clamping strip 30 provided with a series of longitudinally extending slots 31 receiving sheet receiving pegs 26. The opposite end of sheet clamping strip 30 is provided with a return bent portion 32, Fig. 22, for embracing the right-hand end of peg strip 25, as shown in Fig. 21, for securing sheet clamping strip 30 to peg strip 25 in order to rigidly retain peg board accounting sheets mounted on peg strip 25 with the perforations in the margin of said sheets engaged over sheet receiving pegs 26. Sheet clamping strip 30 normally assumes an arcuate position in which form it is constructed so that in applying this strip to peg strip 25, it will be moved from its bowed position into the flat condition, shown in Fig. 21, in order to project the intermediate portions of the strip toward peg strip 25 to firmly retain the margin of peg board accounting sheets mounted on pegs 26.

Peg strip 25 is engaged in channel 4 of rear frame 3 by placing the peg strip in the channel with spring fingers 27 to the right of spring fingers 28. Then, the peg strip is moved to the left until spring fingers 27 interengage with spring fingers 28, as shown in Fig. 21. This detachably locks peg strip 25 in its assembled position on frame 3 for receiving peg board accounting sheets on pegs 26 in a position so that the printed columns on the sheets may be brought into registry with decals 14 and the column arrangement spaced to correspond with the uneven spacing of the different rectangular areas of decals 14. Of course, the printed accounting forms on peg board accounting sheets will be adjusted to provide for this registry. This will also provide for the registry of the columns on the peg board accounting sheets with those on balance sheet 22 whenever these sheets are to be used in combination in accounting procedure.

Whenever the apparatus is used without employing peg board accounting sheets, the peg strip assembly, including strip 25 is removed from channel 4 by disengaging spring fingers 27 and 28. A cover or filler strip 33 is provided with a duplicate set of spring fingers 27 arranged in the same position on the under face thereof as the spring fingers are arranged on peg strip 25, so that filler strip 33 may be detachably engaged in channel 4 with the spring fingers 27 thereon interengaged with spring fingers 28. Filler strip 33 has its top surface supported in the plane of the top surface of rear frame 3, as shown in Figs. 1, 2, 13 and 14.

At the right-hand side of the apparatus, the balance sheet is held against the platen by sheet holding bar 35 mounted at the rear end on sleeve 36 slidably engaged on tubular shaft 6. The front end of sheet holding bar 35 carries a slidable latch 37, Figs. 1, 5 and 6, having a projection on the lower end adapted to enter any one of a series of elongated apertures 38 formed in front framing strip 17 so that the projection on latch 37 can engage the under surface of front framing strip 17 adjacent the elongated aperture. For this purpose, platen 2 and right-hand side rail 1 are provided with registering apertures of a larger size than elongated aperture 38, as illustrated in Figs. 5 and 6. From the disclosure in Fig. 1, it will be clearly understood that slidable latch 37 may be disengaged from the end aperture 38, as illustrated in the drawings, after which sheet holding bar 35 may be moved to the left over the platen with sleeve 36 sliding along shaft 6 so that the sheet holding bar may be positioned to hold a sheet on the platen and the latch 37 engaged in any of the apertures 38 formed in front framing strip 17.

Sheet holding bar 35 may be constructed to normally have a bowed shape in which the front end will extend upwardly away from the platen upon release of latch 37. With this construction of sheet holding bar 35, it will be clearly understood that when the front end of the bar is depressed to engage latch 37 through one of the apertures 38 and interlock the projection on the lower end thereof under front framing strip 17 adjacent the aperture, that the intermediate portion of bar 35 will be held in resilient contact with the upper face of platen 2 or the upper surface of one or more sheets positioned on the platen to resiliently hold the portion of the sheet or sheets thereunder in firm contact with the platen.

Carriage bar 9 carries a sheet clamping means for one or more account sheets which may be any type of ruled accounting sheets used in any accounting system that is suitable for operation with the present apparatus in which the account sheets will cooperate in carrying on accounting operations with the balance sheet 22. This sheet clamping means is illustrated in Figs. 1 to 10 inclusive. A sheet supporting member 40 in the form of an elongated flat strip is positioned on the under side of carriage bar 9 and has the left-hand margin thereof formed to provide a laterally extending flange 41 engaged with the left-hand edge of carriage bar 9. The upper edge of flange 41 terminates adjacent the upper surface of carriage bar 9 where it is formed with a pair of spaced bearing projections 42 having a pair of spaced ball receiving perforations formed in each projection, as illustrated in Fig. 10. Sheet supporting member 40 is formed with recesses 43 to receive the projecting portions of sheet supporting posts 20 extending above the surface of platen 2 in order that the lower surface of member 40 may be engaged on the upper surface of the platen or a sheet supported thereon.

A primary clamping strip 44 is formed with a pair of bearing projections 45 on opposite end portions aligned with the upper portion of bearing projections 42 of sheet supporting member 40 with a bearing aperture formed therein aligned with one of the bearing apertures of each bearing projection 42. A ball bearing engaged in the apertures between the bearing projections provides a hinge mounting for the clamping strip on the sheet supporting member. The upper central portion of primary clamping strip 44 is provided with a handle projection 46 carrying a handle 47 on the free offset end thereof. The opposite margin of primary clamping strip 44 is provided with a laterally extending clamping flange 48 arranged so that when clamping strip 44 is assembled, as shown for example in Figs. 7 to 9, it will lie above carriage bar 9 while depending clamping flange 48 will extend from the right-hand margin thereof in spaced relation to the right of the right-hand edge of carriage bar 9 into engagement with the upper surface of sheet supporting member 40 for clamping cooperation therewith to retain a sheet engaged between member 40 and the free edge of flange 48 against relative movement.

A sheet secured between primary clamping strip 44 and sheet supporting member 40 will have its left-hand edge engaged against the edge of carriage bar 9 which forms a sheet aligning abutment for the sheets held by the primary clamping strip. The primary clamping strip is resiliently urged to engage the free edge of flange 48 with the upper surface of sheet supporting member 40 by means of the mounting of primary clamping strip 44 on sheet supporting member 40 through the medium of ball bearings engaged in the aligned bearing apertures in bearing projections 42 and 45 respectively. Split cylindrical clamp springs 49 are engaged in embracing relation about bearing projections 42 and 45 to secure the hinging movement of primary clamping strip 44 on the ball bearings and the resilient operation thereof into sheet clamping position.

A secondary sheet clamping strip 50 is formed with a depending lateral flange 51 on the left-hand edge, as shown in Figs. 7 to 10 inclusive. The lower edge of lateral flange 51 is provided at opposite end portions thereof with bearing projections 52 offset with relation to bearing projections 45 on primary clamping strip 44 so as to be arranged in end-to-end relation therewith for engagement with ball bearings carried by the other apertures in bearing projections 42 aligned with ball receiving apertures in projections 52. This will provide for the hinged mounting of secondary sheet clamping strip 50 on sheet supporting member 40.

A pair of split cylindrical clamping springs 49 separate from those used in mounting primary clamping strip 44 are provided to secure secondary clamping strips 50 on sheet supporting member 40 by independently embracing portions of bearing projections 42 and the aligned bearing projections 52. By reason of this mounting of secondary clamping strip 50, the angularly extending clamping flange 53 on the right-hand margin thereof, as shown in Figs. 7 to 10, will be projected into engagement with sheet supporting member 40 to resiliently clamp sheets engaged therebetween against removal. The lower central portion of secondary sheet clamping strip 50 is provided with a handle projection 54 on the lower edge of flange 51 in offset relation to handle projection 46 and adjacent thereto in aligned relation and carrying a handle 55 on the offset free end thereof. The secondary clamping strip 50 in being formed with depending flange 51 and clamping flange 53 is formed for assembly in a position so that it embraces primary clamping strip 44 in its assembled relation so as to enclose primary clamping strip 44 in the manner shown in Figs. 7 to 9 inclusive. The free edge of clamping flange 53 engages sheet supporting member 40 in outwardly spaced relation beyond clamping flange 48 of primary clamping strip 44.

Clamping strips 44 and 50 in having independent clamping cooperation with sheet supporting member 40 in spaced relation, provide for the independent clamping of two or more sheets or sets of sheets, one being held by primary clamping strip 44 and the other by secondary clamping strip 50. In positioning sheets for clamping in this clamping means, the first sheet is engaged against the right-hand edge of carriage bar 9, as shown in Figs. 7 to 9, which forms a sheet aligning abutment with both clamping strips held in the inoperative position, as shown in Fig. 8. The strips may then be released to clamp a sheet positioned against carriage bar 9 on sheet supporting member 40. When a second sheet is to be used without disturbing the attachment of the first sheet in the clamping means, then handle 55 is depressed to elevate clamping strip 50 into the position shown in Fig. 9 leaving primary clamping strip 44 in the clamping position.

The second sheet is then placed in the clamping means so that an edge thereof will abut the outer face of clamping flange 48 which forms a sheet aligning abutment for the secondary clamping strip. When the sheet is properly engaged with the edge of flange 48, the secondary clamping strip will be resiliently moved upon manual release of handle 55 into clamping engagement against the second sheet, to not only hold the second sheet in position, but also to cooperate in holding the first sheet in clamped position against accidental shifting between clamping flange 53 and sheet supporting member 40.

The right-hand edge of carriage bar 9 and the outer face of clamping flange 48, both forming sheet aligning abutments, are arranged with respect to the position of apertures 12 and of the sheet clamping means when held in position thereby so that account sheets carried by the sheet clamping means will have a desired column registry relation with selected columns on balance sheet 22 and with selected colored areas identified by the digits on decals 14. In this way, the desired registry of the account sheets with the balance sheet can be obtained so that entries made on the account sheets will be reproduced in the proper columns on the balance sheet or the position of the entry will be out of aligned relation to such an extent that it will be plainly visible.

In placing account sheets in the clamping means, it is desirable to have the horizontal lines on the sheet properly aligned with the lines on the balance sheet and each other. A line scale strip 60 in the form of a sheet metal strip of angular form in cross-section, as shown in Figs. 1 and 7, is mounted on the outer face of secondary clamping strip 50. This strip has a plurality of equally spaced line indicating marks 61 provided thereon so that the lines on account sheets and the balance sheet may be aligned with the marks 61 in securing horizontal alignment of the ruled lines on the several sheets. These line marks 61 are placed on one margin of the strip while the opposite margin is provided with serially arranged numerals indicated at 62 to 70 indicate the numbers of the lines on scale 61. Between the line indicating marks 61 and numerals 62, strip 60 is formed with a row of apertures 63 arranged in aligned relation with each line indicating mark 61. Line scale strip 60 is arranged so that one of the angular portions thereof overlies clamping flange 53 and terminates adjacent the free edge thereof in order to place line indicating marks 61 close to the surface of the sheets clamped in the clamping means.

In view of the fact that one or more account sheets engaged in the clamping means will cover the surface of balance sheet 22 and account sheets under the uppermost sheet mounted in the clamping means, thereby making the line position of the last entry on covered sheets invisible, it is desirable to have a pointer for indicating the line position of the last entry and the line position in which the next entry should be made. For this purpose, the left-hand portion of secondary clamping strip 50 has an elongated channel 64 secured thereto beside line scale strip 60, as clearly shown in Figs. 1 and 7. This channel 64 has the flange at the left-hand side extending inwardly in offset relation from the intermediate portion of the channel a greater distance than the inturned flange on the right-hand side, as shown in Fig. 7. This enables the construction of a line pointer 65 out of a strip of sheet metal, or the like, with a return bend formed along one side to provide a supporting portion 66 slidably engaging in channel 64 for slidably mounting line pointer 65 in the channel.

A handle 67, see Figs. 1, 2 and 7, is mounted on line pointer 65 to provide for convenient manual engagement in sliding line pointer 65 in channel 64. This handle is mounted on line pointer 65 adjacent the portion 66 slidably engaged in channel 64. An aperture 68 is provided in line pointer 65 in the portion aligned with the row of numerals 62 arranged to exhibit one of the numerals therethrough for indicating the position of the pointer and the line on scale 61 opposite which the pointer is positioned so that the pointed end portion 69 of line pointer 65 registers with the line indicated by the numeral. With this line pointer, it will be readily understood how sheets arranged in the clamping means may be set to indicate, in conjunction with balance sheet 22, the line on which the last entry has been made on balance sheet 22 so that it may be determined where to make the next entry on an account sheet carried by the clamping means to have it properly entered on the balance sheet.

The arrangement of account sheets in the clamping means is also gauged by the line scale strip 60 and pointer 65 in obtaining the proper positioning of the account sheets in the clamping means to secure the next entry made on the sheet in the proper position. Line pointer 65 has a bead 70 formed therein in alignment with apertures 63 so that when the line pointer 65 is in a proper line indicating position, bead 70 will engage in the aperture for the proper line indicated. Line pointer 65 is constructed in a manner that it is sufficiently resilient to provide for the springing of the bead 70 into and out of apertures 63 so that the line pointer may be readily adjusted from front to rear of the apparatus on the clamping means and effectively retained in any line indicating position by bead 70 engaging in one of the apertures 63.

The forward end of carriage bar 9 carries a stud 71, Figs. 1, 3 and 4, adapted to be projected through one of a series of apertures 72 formed in front framing strip 17 with much larger apertures in the front edge of platen 2 register, as indicated in Fig. 4. The spacing of apertures 72 in front framing strip 17, is the same as that of apertures 12 in tubular shaft 6 in order that the clamping means and cariage bar 9 will be positioned and held in accurate position over platen 2 and the sheets supported thereon to bring account sheets carried by the clamping mechanism on the carriage bar into proper registry with the balance sheets carried by the platen. When stud 71 engages in one of the apertures 12 corresponding to the position of sleeve 8 on shaft 6, account sheets carried by the clamping mechanism will be held in proper registry with the balance sheet and other sheets mounted on the platen. An indicator 73 is mounted on carriage bar 9 over rear framing strip 15 in aligned relation with apertures 16 therein and arranged to indicate the position of the carriage on shaft 6, when ball 11 is engaged in one of the apertures 12 for indicating the position of the carriage on the apparatus to hold the account sheets therein in proper position to register with the balance sheet in the position indicated by the corresponding digits and colors on transfers 14.

It will be noted that handles 47 and 55, as shown in Fig. 1, are arranged in adjacent relation. This provides for the convenient operation of both the primary and secondary clamping strips through manual operation of the handle so that both handles may be manually engaged with one hand, at the same time, to lift both clamping strips into the position shown in Fig. 8. This operation of these clamping strips is limited by an angle stop member 74 carried on the rear end of carriage bar 9 which may, if desired, be formed as an integral part with indicator 73. In the operation of handles 47 and 55 and the clamping strips 44 and 50, it will be understood that operation of handle 55 will only effect the movement of secondary clamping strip 50 into inoperative non-clamping position. However, manual operation of handle 47 will not only operate primary clamping strip 44 into sheet releasing and non-clamping position, but it will also operate secondary clamping strip 50 into sheet releasing position through the engagement of bearing plates 75 mounted on primary clamping strip 44 in alignment with the lower edge of flange 51 in aligned relation with bearing projections 45.

In connection with some types of accounting work where two or more sheets will be used in superimposed relation on platen 2 and in connection with peg board accounting work, it is found desirable to use a straight edge that will extend entirely across the platen over the sheets mounted thereon and indicate a desired horizontal alignment across the sheets, as well as for use in horizontal ruling in a convenient manner. In the use of a straight edge, line indicator 65 is first removed from channel 64 before the application of the straight edge unit.

The straight edge unit has an attaching plate 80 provided on the left-hand margin, as shown in Figs. 18 to 20, with pins indicated at 81, depending therefrom for insertion through apertures in sheet supporting member 40 and registering apertures in the left-hand margin of platen 2 near the top and bottom portions thereof. The opposite margin of attaching plate 80 has its edge doubled under, as shown in Fig. 19, to provide a double thickness and stiffen the attaching plate so as to make it non-flexible. A guideway 82 is mounted on attaching plate 80 adjacent the folded marginal portion thereof and has the outwardly extending flanges on the free edges thereof providing guide flanges 83 for slidably receiving guide member 84 thereon. Guide member 84 has a slide plate 85 formed on opposite edges with return bent portions providing inturned flanges embracing guide flanges 83 in the manner shown in Fig. 19. This slidably mounts the guide member on guideway 82.

The ends of slide plate 85 are formed with depending ears 86 extending into guideway 82 between the flanges on the opposite edges thereof and are formed with apertures for receiving spring locking member 87 positioned under slide plate 85 and having the ends projecting through the apertures in ears 86 to support locking studs 88 on the free ends thereof, as shown in Fig. 20, for frictional engagement with the inner upper face of guideway 82. Spring locking member 87 has its resiliency normally operating so that the spring will tend to lie in a straight position thus engaging the ends of locking studs 88 with the bottom of guideway 82 and by fulcrum action, rigidly lock guide member 84 on guideway 82 against adjustment.

An operating handle 89 has a stem 90, Figs. 19 and 20, extending through an aperture in guide member 84 with a head 91 on the inner end thereof below slide plate 85 of a larger size than the aperture receiving stem 90. Head 91 is positioned between spring locking member 87 and the under face of slide plate 85. A pin 92 in the central portion of head 91 projects through an aperture in the central portion of spring locking member 87 and holds the spring locking member in centered assembled position in slide plate 85.

By grasping handle 89 and manually depressing the handle, spring locking member 87 may be bowed to a greater extent than that illustrated in Fig. 20 for providing a lever action that will move locking studs 88 out of contact with the bottom of guideway 82 and release guide member 84 of the straight edge unit for slidable movement along guideway 82 into any desired position. When operating handle 89 is released, spring locking member 87 will again operate to engage locking studs 88 with guideway 82 and secure guide member 84 against adjustment.

Guide member 84 also includes a hinge plate 93 rigidly secured to slide plate 85 and having a marginal portion beyond slide plate 85 formed to provide hinge knuckles for receiving a hinge pin therein to hingedly connect the straight edge supporting plate 94 thereon. A pivot pin 95 is secured to straight edge supporting plate 94 and pivotally mounts a straight edge bar 96 of elongated strip form, formed to provide the straight edge extending across the platen in the manner shown in Fig. 18 to indicate substantially horizontal alignment on the sheets on the platen. Bar 96 is provided for limited pivotal movement on stud 95 so that the straight edge of bar 96 may extend in a direct transverse position on platen 2 perpendicular to carriage bar 9 or may extend in a slight angular position from the perpendicular relation to carriage bar 9.

This adjustment of bar 96 is provided to secure a transverse alignment and line indication on sheets supported on platen 2 which may be either account sheets, the balance sheet or peg board accounting sheets and combinations thereof. In their positioning on the board they may have slight variations in transverse alignment of the lines printed on the sheets, due to slight variations in the size of apertures formed in the sheets for engaging the posts on the peg strip and slight variations in the cutting of the margins of the sheets and apertures therein that are to be engaged with sheet supporting posts 20. For this purpose, a headed screw member 97 has the head thereon engaged in a recess in bar 96 and the threaded shank extending through an aperture in the bar and a slot in straight edge supporting plate 94. A knurled nut 98 is threaded on the free end of screw 97 and is operable to tighten the screw so as to hold bar 96 in any position of adjustment relative to supporting plate 94 through the manual operation of nut 98.

This straight edge unit is used when the apparatus is used solely for peg board accounting purposes with peg board accounting sheets mounted on peg strip 25 and also in connection with accounting procedures used with peg board accounting sheets and the balance sheet 22 and also when peg board accounting sheets are used with or without a balance sheet and accounting sheets. Carriage bar 9 is usually located in the position shown in Fig. 18 when using the straight edge unit. In using accounting sheets with straight edge bar 96, they are not attached to the clamping means carried by carriage 9 but may be aligned in position on the board by means of colored areas thereon in proper registry with the corresponding colored areas on decals 14 and with the horizontal lines thereon aligned with the straight edge where the entry on the accounting sheet is to be made for transferring the entry in making a duplicate thereof on selected peg board sheets and a balance sheet which may be under the portion where the entry is made. It will also be understood that instead of using the straight edge assembly, accounting work may be done with peg board accounting sheets, account sheets and the balance sheet through placing the account sheets in the clamping means in order that they will be held by the primary and secondary clamping strips for proper registry in their positioning on platen 2 to register colored areas on the account sheets with the corresponding colors on decals 14 in order to secure the production of copies of the entry made on the account sheets in the proper spaces and columns on both peg board accounting sheets, as well as the balance sheet. The line indication for the entries will then be made by the line pointer 65. The portion of carriage 9, sheet supporting member 40 and the clamping strips aligned with the peg strip are recessed so the sheet supporting member 41 will lie flat on the platen in all positions of adjustment without interfering with the peg strip assembly.

Peg board accounting sheets have not been illustrated in the drawings because these sheets are of well-known form together with the methods of mounting the sheets on the pegs when used in peg board accounting. It will be obvious to one skilled in the art how peg board accounting sheets are mounted on peg strip 25 and it is only necessary to understand that the peg board accounting sheets may have appropriately colored sections or areas printed thereon to register with the corresponding colored areas on decals 14, so that these peg board accounting sheets may be registered in the desired and proper position on platen 2 for receiving entries in the proper column. This coloring for securing registry of the sheets is obtained in the same manner as used in connection with registering account sheets with decals 14 in the manner explained in the aforementioned patent. In this way, vertical column registry on the sheets and horizontal line registry on all of the accounting sheets used can be secured in such a manner that if an entry is made with any one of the sheets positioned in the wrong position, the entry will appear on all the sheets, but the top sheet, in a position offset from the column arrangement so that the figures in the entry will be out of alignment with proper made entries on the sheets and thereby immediately indicate the making of an improper entry. In this way, this improved accountant's apparatus provides for many more accounting operations than can be obtained by the use of the apparatus disclosed in the aforementioned patent with the result that many accounting operations are facilitated by the improved apparatus constructed and operated in the manner described herein.

The invention claimed is:

1. In an account's apparatus, in combination a platen provided with means for detachably holding a balance sheet in stationary position thereon, plural account sheet clamping means movably mounted on said platen for holding plural account sheets offset relative one to the other for movement therewith over the surface of said platen and balance sheet, means to support the account sheets with the horizontal lines thereon in registry with the horizontal lines on said balance sheet, registering means securing the positioning of said account sheet clamping means in any one of a series of positions to obtain registry between selected vertical columns on said account and balance sheets, peg board sheet engaging means mounted in predetermined positions on said platen for cooperation to hold peg board accounting sheets in registered relation to said balance and accounting sheets to provide vertical column and horizontal line registry therebetween to provide for combination accounting between all of said registered sheets.

2. In an accountant's apparatus, in combination a platen provided with means for detachably holding a balance sheet in stationary position thereon, individually releasable plural account sheet clamping means movably mounted on said platen for holding plural account sheets for movement therewith over the surface of said platen and balance sheet, means to support the account sheets with the horizontal lines thereon in registry with the horizontal lines on said balance sheet, registering means disposed to secure the positioning of said plural account sheet clamping means in any one of a series of positions to obtain registry between selected vertical columns on said account and balance sheets, a peg strip having a plurality of equally spaced sheet engaging pegs thereon, and means detachably securing said peg strip to said platen for supporting peg board accounting sheets on said platen to provide vertical column and horizontal line registry between selected columns and lines on said peg board, account and balance sheets.

3. In an accountant's apparatus, in combination a platen provided with means for detachably holding a balance sheet in stationary position thereon, plural account sheet clamping means movably mounted on said platen for holding plural account sheets for concurrent movement therewith over the surface of said platen and balance sheet means to support the account sheets with the horizontal lines thereon in registry with the horizontal lines on said balance sheet, registering means disposed to secure the positioning of said account sheet clamping means in any one of a series of positions to obtain registry between selected vertical columns on said account and balance sheets, a peg strip having a plurality of equally spaced sheet engaging pegs thereon, means for detachably retaining peg board accounting sheets thereon, and means detachably securing said peg strip to said platen for supporting said peg board accounting sheets on said platen with vertical column and horizontal line registry between selected columns and lines on said peg board, account and balance sheets.

4. In an accountant's apparatus, a sheet clamping device comprising a carriage bar, a sheet supporting strip member mounted on said bar with opposite margins projecting beyond said bar, pivot portions projecting outwardly from one edge of said strip member, a pair of clamping strips each having pivot portions projecting in adjacent relation from one edge having a hinge mounting on the pivot portions of said strip member and having laterally extending sheet engaging flanges on the other margin for normally engaging the other margin of said strip member in spaced parallel relation parallel to said bar for independent sheet retaining cooperation throughout substantially the entire length of said bar, resilient means engaged with said pivot portions for normally moving said clamping strips toward said strip member, and a handle on each clamping strip lying in adjacent relation to the handle on the other strip for manual engagement of either or both handles in the operation of said clamping strips.

5. In an accountant's apparatus, a sheet clamping device comprising a carriage bar, a sheet supporting strip member mounted on said bar with opposite margins projecting in spaced relation beyond said bar, bearing projections on one margin of said strip member, a pair of clamping strips each having bearing projections on one margin in spaced parallel relation to the bearing projections on said strip member and having laterally extending sheet engaging flanges on the other margin for normally engaging the other margin of said strip member in spaced relation for independent sheet retaining cooperation therewith, bearing members between said bearing projections, cylindrical clamp springs embracing said bearing projections and normally moving said clamping strips toward said strip member, and a handle on each clamping strip manually operable to disengage the clamping strip from said sheet supporting strip member, and means actuated by one of said handles for engaging the other clamping strip and disengaging both clamping strips from said sheet supporting strip member in the operation of said one handle.

6. In an accountant's apparatus, a platen and sheet holding means thereon comprising a sheet positioning abutment on one margin of said platen defining one side of a groove formed in said platen, a pair of sheet supporting posts mounted on said platen adjacent the edge of said groove opposite said abutment, and flanges on said posts extending toward said abutment in overhanging relation over said groove for cooperation with said abutment in retaining a balance sheet against detachment in stationary position on said platen by apertures in said sheet engaging under said flanges and over said posts and the portion of said sheet between said apertures and an adjacent edge being substantially equal to the distance between said abutment and posts, said platen having the groove formed therein of a depth sufficient to provide for movement of the margin of said sheet into the bottom of said groove in attaching and detaching said sheet from engagement with said posts.

7. In an accountant's apparatus, a platen provided with means for detachably holding a balance sheet in stationary position thereon, plural account sheet clamping means mounted on said platen for holding plural offset account sheets in horizontal line registry with said balance sheet, line identifying indicia disposed on said clamping means, a line finder having a guideway detachably engaged in said clamping means, a straight edge having one end slidably engaged with said guideway for movement between opposite ends thereof for indicating the horizontal lines in alignment therewith on one or more sheets supported by said platen including said balance sheet, and means thereon cooperable with said line identifying indicia to identify the respective horizontal lines.

8. In an accountant's apparatus, a platen provided with means for detachably holding a balance sheet in stationary position thereon, plural account sheet clamping means movably mounted on said platen for holding account sheets in horizontal registry with said balance sheet and movable transversely across said platen, a line finder having an attaching plate detachably secured to said sheet clamping means along one margin in a position perpendicular to the direction of movement of said sheet clamping means, the opposite margin of said attaching plate having a guideway thereon, and a straight edge having a guide member formed on one end slidably engaged in said guideway, said straight edge extending laterally from said guideway across said platen over the sheets therein for indicating the horizontally aligned portions across said sheets.

9. In an accountant's apparatus, a platen provided with means for detachably holding a balance sheet in stationary position thereon, account sheet clamping means mounted on said platen having a pair of resiliently engaged clamping flanges is for holding an account sheet in horizontal registry with said balance sheet and movable transversely across said platen, a line finder having an attaching plate detachably secured between said clamping flanges along one margin in a position perpendicular to the direction of movement of said sheet clamping means, the opposite margin of said attaching plate projecting beyond said clamping flanges and having a guideway thereon, a straight edge extending lateraly from said guideway over said platen and having a guide member thereon slidably engaged in said guideway, and a peg strip mounted on said platen along a margin thereof in substantially parallel relation to said straight edge for supporting peg board accounting sheets in registered relation on said board with any other sheets supported thereon, said straight edge cooperating in aligning the horizontal portions thereof.

10. In an accountant's apparatus a platen provided with means for detachably holding a balance sheet in stationary position thereon, account sheet clamping means movably mounted on said platen in transversely extending relation and adapted to hold an account sheet in horizontal line registry with said balance sheet for movement thereof over the surface of said platen and balance sheet, a line indicator comprising a scale strip mounted on said account sheet clamping means for indicating horizontal line registry between said balance and account sheets, a channel member mounted on said account sheet clamping means in parallel relation adjacent said scale strip, a line pointer formed with one end slidably engaged in said channel member for support therein and movement of the opposite pointed end over said scale strip for line indicating cooperation therewith, and complementary means on said opposite pointed end of said line pointer and said scale strip for cooperation to normally retain said line pointer in any line indicating position thereon.

11. An accountant's apparatus comprising a platen, means on one marginal portion of said platen for securing a balance sheet thereon, a peg strip mounted on an adjacent margin of said platen for independently securing an accounting sheet on said platen in superimposed predetermined relation over said balance sheet, and sheet clamping means slidably mounted at one end on one margin of said platen and extending transversely across said platen for independently mounting plural account sheets offset one to the other in superimposed relation to said balance and accounting sheets mounted on said first-mentioned means and peg strip respectively, whereby said clamping means may be concurrently operated to vary the position of the sheets held thereby relative to the other sheets and the accounting sheet may be independently positioned on said peg strip in variable relation to the other sheets.

12. In an accountant's apparatus, in combination, a platen, means for detachably holding a balance sheet in stationary position thereon, account sheet clamping means movably on said platen and arranged for movement over the surface of said platen and balance sheet, means for securing said account sheet clamping means in alternate positions across said platen, said last means being disposed so as to effect alignment of selected vertical account sheet columns with selected balance sheet columns, line indicating means movable relative to the horizontal lines disposed on said sheets, a peg strip mounted on said platen in predetermined relation to said balance sheet holding means, including peg-type accounting sheet clamping means, registering means and line indicating means, and said peg-type accounting sheet registering means arranged and adapted to register vertical columns and horizontal lines of peg-type accounting sheets disposed thereon in registry with selected lines and columns on said balance and account sheets.

CARL F. WOLTERS.

REFERENCES CITED

The following references are of record in the file of this patent:

UNITED STATES PATENTS

| Number | Name | Date |
| --- | --- | --- |
| 933,910 | Loewenbach | Sept. 14, 1909 |
| 963,556 | Hill | July 5, 1910 |
| 1,073,939 | Spedden | Sept. 23, 1913 |
| 1,474,102 | Ashmore | Nov. 13, 1923 |
| 1,669,809 | Card | May 15, 1928 |
| 1,828,417 | Kebeher | Oct. 20, 1931 |
| 2,117,372 | Smith et al. | May 17, 1938 |
| 2,163,193 | Critchfield | June 20, 1939 |
| 2,311,052 | Hurup | Feb. 16, 1943 |
| 2,377,466 | Van Den Akken | June 5, 1945 |

FOREIGN PATENTS

| Number | Country | Date |
| --- | --- | --- |
| 509,691 | Germany | Jan. 26, 1926 |
| 111,734 | Austria | Dec. 27, 1928 |
| 135,201 | Austria | Nov. 10, 1933 |
| 680,120 | Germany | Aug. 23, 1939 |